June 15, 1926. 1,589,140
C. L. FREY
TOY VEHICLE
Filed Nov. 14, 1924   2 Sheets-Sheet 1
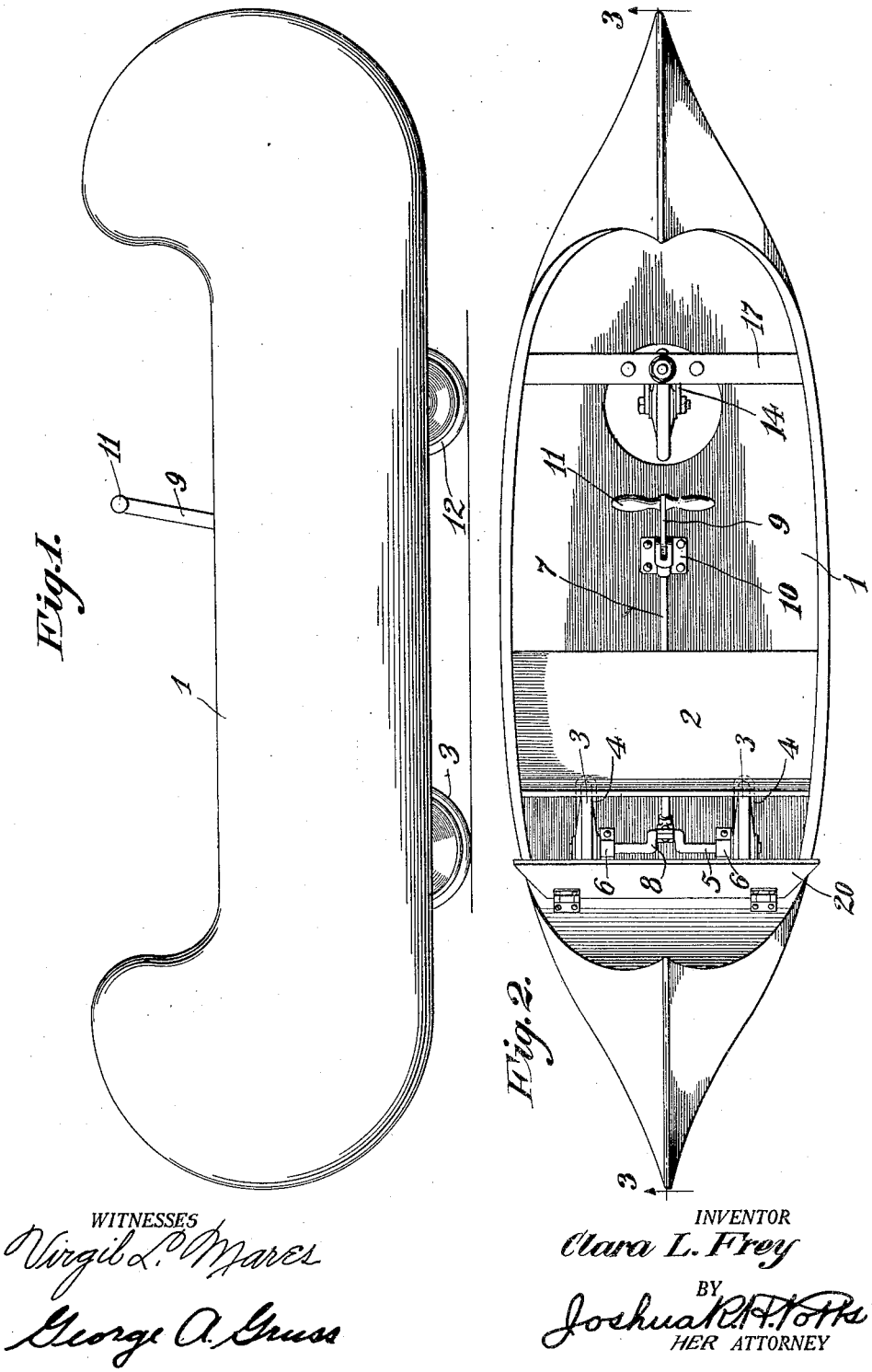
WITNESSES
INVENTOR
Clara L. Frey
BY
HER ATTORNEY

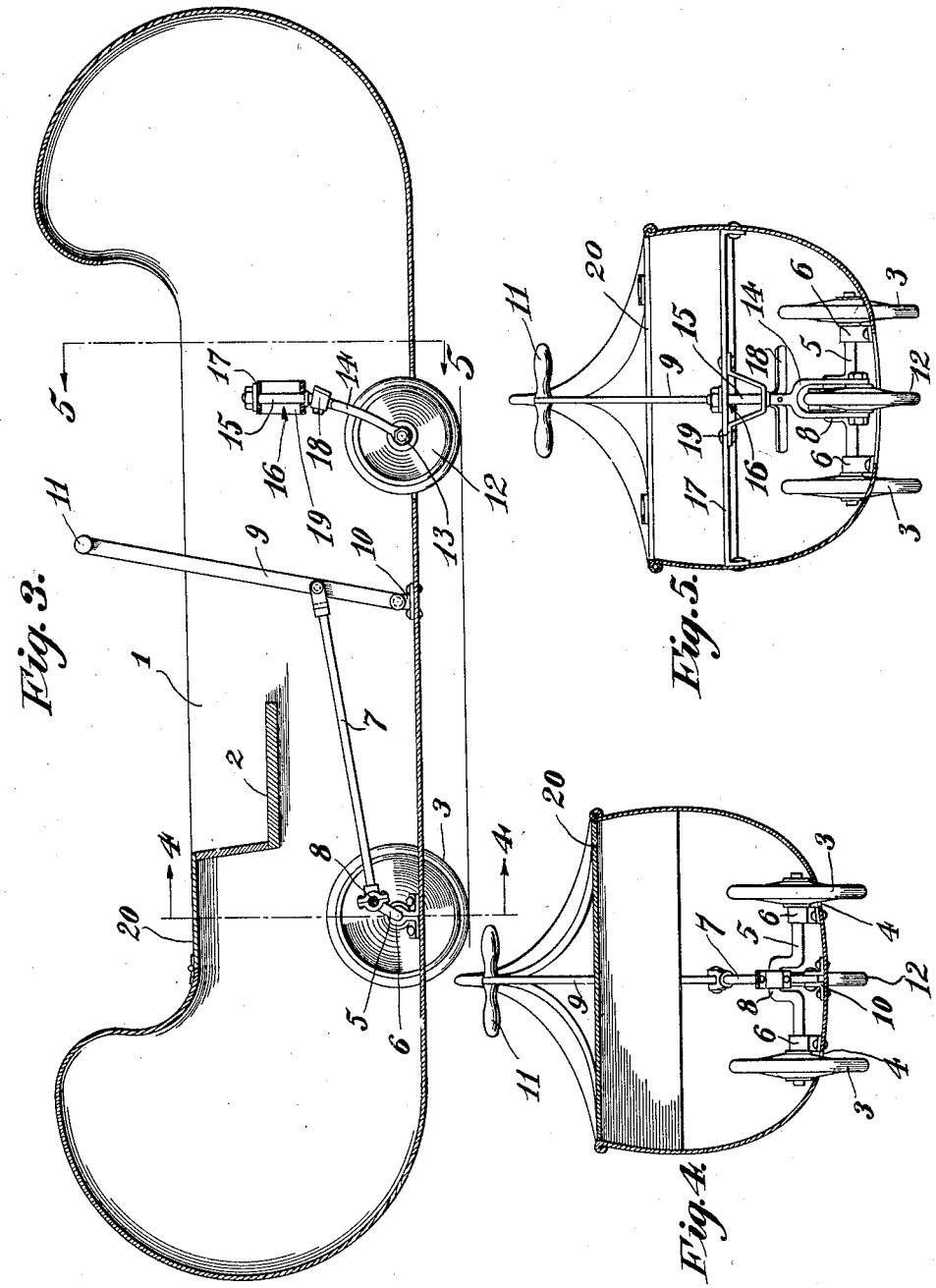

Patented June 15, 1926.

1,589,140

UNITED STATES PATENT OFFICE.

CLARA L. FREY, OF PHILADELPHIA, PENNSYLVANIA.

TOY VEHICLE.

Application filed November 14, 1924. Serial No. 749,843.

The object of my invention is to provide a wheeled toy vehicle having the general form and appearance of a canoe and so constructed that it may be driven and steered by a child sitting therein.

This object, and other advantageous ends which will be described hereinafter, I attain in the following manner, reference being had to the accompanying drawings in which—

Figure 1 is a side elevation of a toy vehicle constructed in accordance with my invention, Figure 2 a top plan view of the same, Figure 3 a section on line 3—3 of Figure 2, Figure 4 a section on line 4—4 of Figure 3, and Figure 5 a section on line 5—5 of Figure 3.

Referring to the drawings, 1 indicates the hollow canoe-shaped body of the vehicle, 2 a seat adapted to receive the user, 3 ground-engaging driving wheels in the rear of the seat, extending through openings 4 in the bottom of the body of the vehicle and fixed to a crank axle 5 mounted in bearings 6 carried by the body, 7 a pitman pivotally connected with the crank 8 of the crank axle and with a lever 9 pivoted in a bearing 10, fixed to the bottom of the canoe-shaped body, and carrying, at its free end, a handle bar 11, 12 a ground-engaging steering wheel rotatably mounted upon an axle 13 carried by a fork 14 integral with a steering rod 15, rotatably mounted in a bearing 16 carried by a cross brace 17 fixed to the sides of the canoe-shaped body, and having fixed thereto a foot bar 18 by which it may be oscillated to change the direction of travel of the steering wheel. The cross brace 17 also carries a substantially U-shaped bracket 19 depending therefrom and having an aperture in its base encircling the steering rod and forming a second bearing therefor. The canoe-shaped body is provided, in the rear of the seat, with a hinged cover 20 which affords ready access to the crank axle and the operative parts.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A toy vehicle including a hollow canoe-shaped body; a pair of driving wheels extending through openings in the bottom of the body and fixed upon a crank axle; means for actuating the crank axle; a steering wheel extending through the bottom of the body; a steering rod connected with the steering wheel; a cross brace providing a bearing for the steering rod; a bracket depending from the cross brace providing a second bearing for said rod, and means for actuating the steering rod.

2. A toy vehicle including a hollow canoe-shaped body having a seat within its shell; a pair of driving wheels extending through openings in the body, in the rear of the seat and fixed upon a crank axle; a hinged cover in the rear of the seat providing access to the crank axle and its connections; a steering wheel extending through the bottom of the body, and means for actuating the crank axle and the steering wheel.

In testimony whereof I have signed my name to this specification.

CLARA L. FREY.